United States Patent [19]
Lee

[11] 3,987,641
[45] Oct. 26, 1976

[54] FREEZE CONCENTRATION RECOVERY PROCESS FOR WOOD PULPING

[75] Inventor: Hong H. Lee, Charleston Heights, S.C.

[73] Assignee: Westvaco Corporation, New York, N.Y.

[22] Filed: Feb. 3, 1975

[21] Appl. No.: 546,423

[52] U.S. Cl. ............................. 62/541; 159/DIG. 5; 23/273 F; 162/29; 162/16; 62/542; 62/543; 62/544
[51] Int. Cl.² ............................................. B01D 9/04
[58] Field of Search ............ 162/29, 30, 16; 210/71; 62/58; 23/273 F; 159/DIG. 5

[56] References Cited
UNITED STATES PATENTS

| | | | |
|---|---|---|---|
| 1,359,911 | 11/1920 | Oman | 62/58 |
| 2,424,663 | 7/1947 | Mantle | 65/58 W |
| 2,751,890 | 6/1956 | Rush | 23/273 F |
| 2,780,281 | 2/1957 | Reinert | 159/DIG. 5 |
| 2,780,663 | 2/1957 | Guinness | 23/273 F |
| 2,794,840 | 6/1957 | Vela | 23/273 F |
| 2,823,242 | 2/1958 | McKay | 23/273 F |
| 3,098,735 | 7/1963 | Clark | 62/58 |
| 3,248,890 | 5/1966 | Oman | 159/DIG. 5 |
| 3,269,136 | 8/1966 | Umano | 62/58 |
| 3,561,225 | 2/1971 | Hinton | 62/58 |
| 3,561,225 | 2/1971 | Hinton | 62/58 |

FOREIGN PATENTS OR APPLICATIONS

| | | | |
|---|---|---|---|
| 521,842 | 3/1955 | Italy | 23/273 F |

*Primary Examiner*—Stephen J. Emery
*Attorney, Agent, or Firm*—W. Allen Marcontell; Richard L. Schmalz

[57] ABSTRACT

Pulping liquor borne solids are concentrated within an aqueous solution by a successive plurality of freezing steps wherein a discrete quantity of the solution is crystallized in each step by freezing. The water crystals from each freezing step are subsequently separated from the remaining liquid solution by screening and applying axial pressure to the crystalline mass. Greater efficiencies may be obtained in some cases by mixing or reslurrying a pressed, crystalline mass and pressing a second time. Another auxiliary separation step comprises a quiescent thaw of the crystalline mass from the first two press steps to permit additional dissolved solids to be drained away from the purified water ice.

11 Claims, 7 Drawing Figures

| PROCESS STAGE | THICK PHASE | | | THIN PHASE | | |
|---|---|---|---|---|---|---|
| | % SOLIDS | °F TEMP. | LB. WEIGHT | % SOLIDS | °F TEMP. | LB. WEIGHT |
| B.L. In | 12 | 190 | 1.0 | | | |
| $X_1$ | 12 | 153 | 1.0 | | | |
| $X_2$ | 12 | 105 | 1.0 | | | |
| $X_3$ | 12 | 78.2 | 1.0 | | | |
| B | 10 | 34 | 2.336 | | | |
| $R_1$ | 10 | 8 | 2.336 | | | |
| $P_1$ | 15 | 8 | 1.385 | 2.7 | 8 | 0.951 |
| $P_{1A}$ | 4.5 | 8 | 0.565 | 0.05 | 8 | 0.385 |
| $R_{1A}$ | 4.5 | 8 | 0.565 | | | |
| $P_{1B}$ | 7.5 | 8 | 0.336 | 0.08 | 8 | 0.229 |
| $R_2$ | 15 | 2 | 1.385 | | | |
| $P_2$ | 21 | 2 | 0.873 | 4.8 | 2 | 0.512 |
| $P_{2A}$ | 6 | 2 | 0.409 | 0.04 | 2 | 0.103 |
| $R_3$ | 21 | -5 | 0.873 | | | |
| $P_3$ | 28 | -5 | 0.570 | 7.8 | -5 | 0.303 |
| $R_4$ | 28 | -10 | 0.570 | | | |
| $P_4$ | 34 | -10 | 0.406 | 13 | -10 | 0.164 |
| $R_5$ | 34 | -10 | 0.406 | | | |
| $P_5$ | 38 | -10 | 0.336 | 14.6 | -10 | 0.070 |
| $R_6$ | 38 | -15 | 0.336 | | | |
| $P_6$ | 42 | -15 | 0.284 | 16.7 | -15 | 0.054 |
| $X_1$ | 42 | 143 | 0.284 | | | |
| $X_4$ | 42 | 200 | 0.284 | | | |
| $H_1$ | 42 | 230 | 0.284 | | | |

*FIG. 7.*

FREEZE CONCENTRATION RECOVERY PROCESS FOR WOOD PULPING

BACKGROUND OF THE INVENTION

1. Field of the Invention

The present invention relates to the field of concentrating dissolved solids by freezing the solvent for the process purpose of mechanical separation. More particularly, the present invention relates to the recovery of fuel and chemical values from wood pulping liquors by freezing the water solvent thereof.

2. Description of the Prior Art

Pursuant of the manufacture of cellulosic fiber products such as paper, the natural lignin structural bond between cellulose fibers is dissolved by a thermochemical digestion process.

The aqueous residual from such digestion processes, characterized as black liquor, is laden with the dissolved organic lignin in various degrees of combination with the organic digestion chemicals.

As originally separated from the digested wood pulp, the black liquor solution contains approximately 90% water and 10% solids. These solids are in the form of dissolved organic wood substance and spent digestion chemicals.

Being a carbonaceous material, dissolved wood substance has a heating value of 5000 BTU per pound. However, in combination with the water solvent and other inorganic compounds, this heating value is somewhat reduced. Nevertheless, in a practical black liquor combination comprising approximately 60% solids and 40% water, the dissolved organics contribute a net thermal energy of approximately 2500 BTU per pound.

As a consequence of the heating value contained in black liquor, the substance is used as fuel to support processes whereby the black liquor chemical values are recovered for re-use in the wood digestion step. In the case of low yield pulping wherein a majority of the lignin present in the raw wood furnish is removed, the black liquor energy content is more than adequate to support the entire chemical recovery process by conventional means. Self-supporting recovery plants for low yield pulping, however, are more marginal.

A primary component of conventional recovery plants is a multiple effect evaporator wherein the black liquor solids are evaporatively concentrated from a solution of approximately 10% solids strength to approximately 60% solids strength. The heat required to drive this evaporative concentration step consumes a majority of the available energy in the black liquor.

Due to the fact that the heat of fusion of the black liquor solvent, water, is only 15% of the solvent heat of evaporation, it has been suggested in the past that the black liquor solids concentration step may be conducted more efficiently by means of a freeze concentration process. However, no complete system thereof has been previously devised. Examples of such suggestions may be found in the following U.S. patent disclosures: U.S. Pat. Nos. 1,359,911 to E. Oman; 1,396,028 to W. H. Dickerson; 2,780,281 to A. E. Reinert; 3,098,735 to H. H. Clark; and 3,248,890 to E. Oman.

Relative to techniques and apparatus for concentrating the solid content of other aqueous solution borne substances, reference is directed to the following U.S. patent disclosures: U.S. Pat. Nos. 2,424,663 to H. L. Mantle; 2,617,274 to J. Schmidt; 3,587,859 to R. F. Probstein et al.; 3,824,799 to D. Ganiaris; and 3,835,658 to J. H. Wilson.

SUMMARY OF THE INVENTION

The freeze concentration process of the present invention comprises a multiplicity of steps, for example, 6, wherein a black liquor flow stream is cooled to a temperature whereat water dissociates from the solution by crystallizing. The solution-crystal mixture is separated by screening and the remaining thin phase (crystalline ice) constituency is pressed axially to express entrained residual thick phase (heavily concentrated with solids).

Subsequent to the initial solution-crystal separation, the thick phase yield from each separation step progresses to the next cooling unit.

The thin phase yield from the first two separation stages is subjected only to a homogenization or reslurrying step before repeated pressing.

Thin phase yield from the auxiliary presses of the first two separation stages may be further purified by a select, quiescent thawing whereby remaining thick phase merely drains away from the conglomerated ice mass as the lower heat of fusion compounds melt.

All other thin phase yield is utilized for heat exchange capacity in cooling the incoming black liquor flow stream before being combined therewith for recycling.

By means of the present invention, 12% solid content, 190° F black liquor may be reduced to 42% solid content at 230° F in six serial freeze-press stages and one parallel auxiliary stage. Only 49% of the energy required of a sextuple effect thermal evaporator is needed.

BRIEF DESCRIPTION OF THE DRAWING

Relative to the Drawing wherein like reference characters designate like elements through the several figures:

FIG. 7 is a tabulation of operating parameters for the FIG. 2 system.

DESCRIPTION OF THE PREFERRED EMBODIMENT

Figure 1:
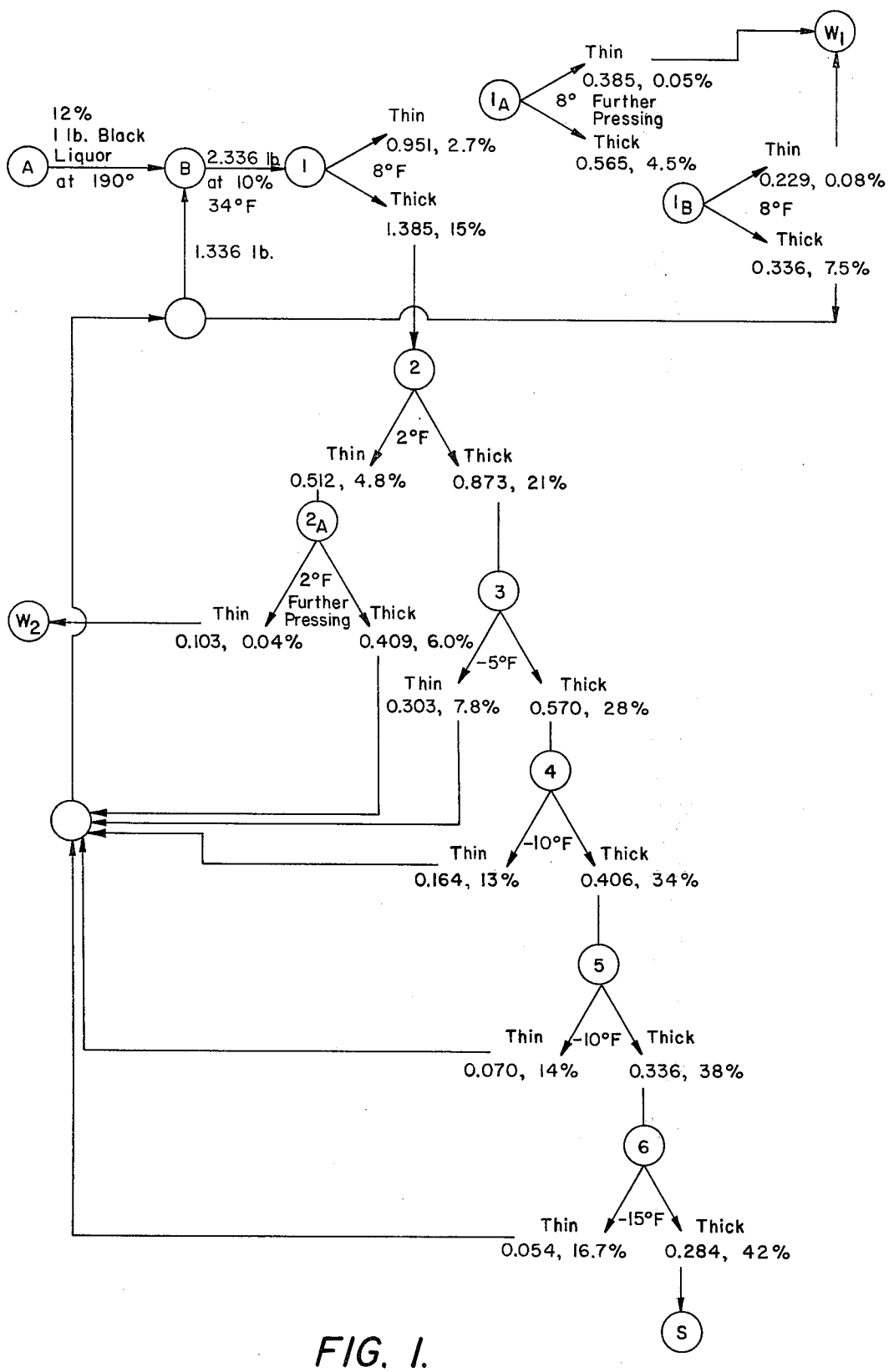
FIG. 1 illustrates a brief flow schematic of the present process invention.

Relative to FIG. 1 wherein the black liquor flow stream is schematically shown in progression through the several process stages of the concentration plant. One pound of 12% solids, 190° F black liquor is received at the entrance station A per unit for mixture at station B with 1.336 pounds of process effluent. Simultaneously, 0.229 pound and 0.103 pound of thin phase yield, predominantly water, is withdrawn from exit stations $W_1$ and $W_2$. 0.282 pound of 42% solids concentrate is withdrawn at exit station S.

The total of the system exit mass is the collective sum across exit stations $W_1$, $W_2$ and S which is equal to one pound. The flow system is, therefore, in balance with the inflow and outflow streams of equal magnitude. However, 1,336 pounds of recycle material is mixed with the virgin black liquor stream for further recoveries. Therefore, the total mass processed at station 1 is 2.336 pounds of 10% solids solution.

In the first stage, the flow stream is reduced in temperature to approximately 8° F thereby crystallizing a certain percentage of water therein. Although the nucleus of individual water crystals is of pure water composition, the growth thereof from numerous, homogenously dispersed nucleation points occludes solids within the interstices between adjacent crystals. Moreover, as the crystal grows with diminishing temperature, the chemical composition thereof graduates from pure water to other, dilute inorganic compounds.

Further in the first stage, the slurry comprising a thin phase of particulate crystals in the presence of a residual liquid thick phase is screened for a preliminary or gross mechanical separation of the crystal particles from the liquid. Thereafter, the screened crystals are subjected to an axial pressing by means such as that disclosed by J. Schmidt in U.S. Pat. No. 2,617,274. Specifically, the specification of axial pressing refers to an absence of shear force between the adjacent crystals. Of course, absolute avoidance of shear in the compaction of a crystalline mass is an impossibility due to the migration and transport of crystals during the early stages of diminishing volume. However, once the crystalline mass is conglomerated, the structural integrity of the conglomeration should not be disturbed by the wiping of shearing action of an Archimedes screw or a roll nip. Press forces on the ice mass should be limited to an unidirectional plane.

The magnitude of pressure required to express the residual thick phase is variable relative to the magnitude of surface area available to drainage conduits as a percentage function of the total thin phase mass surface area. An exposed surface area in the order of 10% will require from 50 to 100 psi. Conversely, an exposed surface area of only 1% may require from 1500 to 2000 psi. Obviously, the particular geometry of the press apparatus will determine the relative magnitude of exposed area.

It is also appropriate to state that the screening and pressing steps described herein need not be distinct in that the functions are performed on separate apparatus. For example, the screening may occur simultaneously with the volumetric closure of a reciprocating piston press as described by J. Schmidt.

Under the stress induced heat of the axial pressing step, the lower freezing point compounds attached to the crystals reliquefy to provide a fluid vehicle within which occluded solids are washed from the crystalline mass to be combined with the initially screened liquid. Consequently, approximately 0.951 pound of material comprising 2.7% solids remains with the crystalline mass.

In the case of the first freezing stage, the residual crystalline mass is, after the first press step, gently slurried to homogenize the remaining solids which were entrapped within the interstitial maze of the compacted crystal mass. Thereafter, without additional cooling, the ice mass is mechanically pressed again to express additional solids. This secondary first stage pressing separates 0.385 pound of 0.05% solid content material from 0.565 pound of 4.5% solids content material.

The thin phase 0.05% solid content material is removed from the concentration flow stream at exit station $W_1$.

However, the thick phase 4.5% solids material is further cooled at station $1_B$ to remove additional heat of fusion to crystallize additional solvent at the same 8° F temperature. Subsequently, station $1_B$ screening and pressing separates 0.229 pound of 0.08% solid material from 0.336 pound of 7.5% solids material.

The thin phase 0.08% solid material is removed from the concentration flow stream at exit station $W_1$ whereas the thick phase 7.5% solids material is recycle makeup to be combined with virgin black liquor at mixing station B.

Returning now to the thick phase liquid separated by the first, stage 1 screening and pressing, 1.385 pounds of 15% solids material was produced. This 15% solids material is advanced to a stage 2 cooling unit which reduced the temperature thereof to 2° F. Subsequent screening and pressing separates 0.512 pound of 4.8% solids thin phase material from 0.873 pound of 21% solids thick phase material.

The stage 2, 4.8% solids thin phase product is, at stage $2_A$, reslurried without additional refrigeration and pressed again to separate 0.103 pound of 0.4% solid thin phase material from 0.409 pound of 6.0% solids thick phase material.

The 0.04% solid material is removed from the concentration flow stream at exit station $W_2$. The 6.0% solids material contributes to the mixing station B recycle makeup.

The 21% solids thick phase material separated at stage 2 is further refrigerated at stage 3 to −5° F. Subsequent screening and pressing separates 0.303 pound of 7.8% solids thin phase material from 0.570 pound of 28% solids thick phase material.

The 0.303% solid material contributes to the mixing station B recycle makeup whereas the 28% solids material advances to stage 4.

Stage 4 refrigeration reduces the flow stream to −10° F and screening and pressing separates 0.164 pound of 13% solids thin phase material from 0.406 pound of 45% solids thick phase material.

The 13% solids material contributes to mixing station B recycle makeup whereas the 34% solids material advances to stage 5.

Stage 5 refrigeration sustains the heavy flow stream at −10° F by removing additional heat of fusion before screening and pressing separates 0.070 pound of 14.6% solids thin phase material from 0.336 pound of 38% solids thick phase material.

The 14.6% solids material contributes to mixing station B recycle makeup whereas the 38% solids material advances to stage 6.

Stage 6 refrigeration reduces the thick phase flow stream to −15° F and screening and pressing separates 0.054 pound of 16.7% solids thin phase material from 0.284 pound of 42% solids thick phase material.

The 16.7% solids material contributes to mixing station B recycle makeup whereas the 42% solids material is heated by the incoming virgin black liquor flow stream to facilitate pumping flow to a conventional direct contact evaporator where additional water is evaporatively removed to increase the thick phase solids concentration to the order of 65% prior to furnace injection as fuel.

Figure 2:
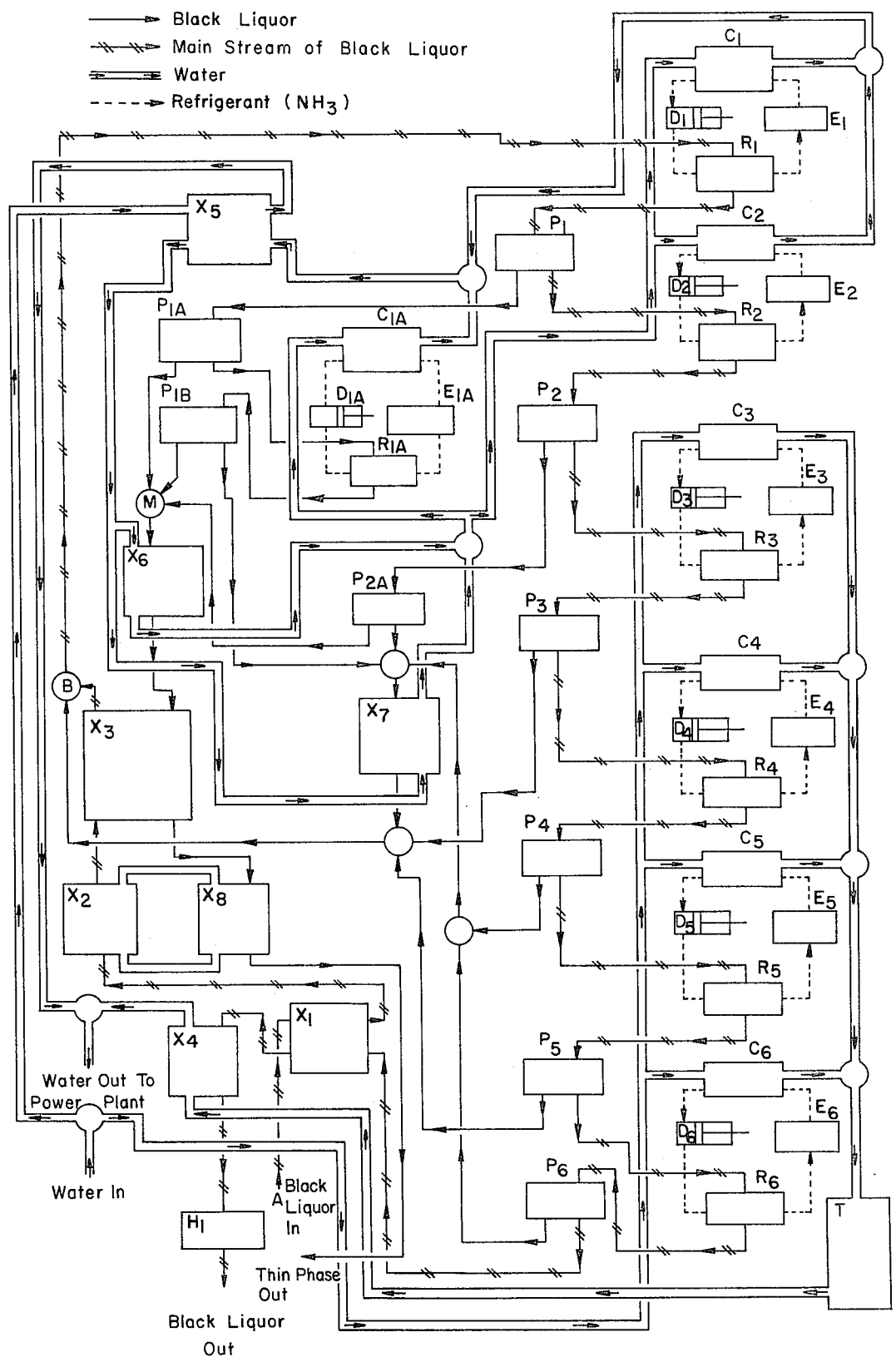
FIG. 2 illustrates a detailed flow schematic of the present process invention.

FIG. 2 illustrates a more detailed schematic of the invention and shows the exploitation of direct and indirect heat exchange equipment to efficiently manage the internal heat flow of the system. Specific operating parameters for the FIG. 2 system, as described hereafter, are tabulated in FIG. 7. The 190° F, 12% solids virgin black liquor enters the concentration system at station A and is heat exchanged at $X_1$ with thick, 42% solids thick phase effluent from the system. The $X_1$ heat exchange reduces 12% liquor flow stream to 153° F. The flow stream is heat exchanged again at $X_2$ with closed cycle water circulating between heat exchangers $X_2$ and $X_8$.

Upon leaving heat exchanger $X_2$, the virgin liquor flow stream has 105° F sensible heat content and is heat exchanged again at $X_3$ with thin phase effluent from screener - presser units $P_{1A}$, $P_{1B}$ and $P_{2A}$. The $X_3$ exchange reduces the virgin liquor stream to 78.2° F for combination with recycle material at mixing station B.

From the mixing station B the 2.336 pounds flow stream has 10% solids at 34° F for delivery to the stage 1 refrigerator $R_1$ for reduction in temperature to 8° F.

As described, all refrigeration systems are shown to be conventional ammonia mechanical systems comprising a compressor E, a condenser C and an accumulator D. An external plant water system cools the compressed ammonia gas in preparation for subsequent heat absorptive expansion in $R_1$. It should be understood, however, that other heat transfer mechanisms are suitable for the purposes herein described and that my invention is not limited to this particular mechanism.

From the refrigerator $R_1$ the 10%, 8° F liquor flow stream is screened and pressed at $P_1$ to produce a 0.951 pound, 2.7% solids thin phase yield which is slurried and further pressed at $P_{1A}$.

A 0.565 pound, 4.5% solids thick phase yield from press $P_{1A}$ is refrigerated at $R_{1A}$ only to remove additional heat of fusion and sustained at 8° F before further pressing at $P_{1B}$. The 0.385 pound, 0.05% solid, 8° F thin phase yield from press $P_{1A}$ is combined with thin phase yield from subsequent press stations $P_{1B}$ and $P_{2A}$ to absorb condenser water heat at exchanger $X_6$.

The 0.336 pound, 7.5% solids, 8° F thick phase from press $P_{1B}$ is combined with other flow streams for heat exchange with condenser water at $X_7$.

Relative to the 1.385 pounds, 15% solids, 8° F thick phase from press $P_1$, it is refrigerated to 2° F at $R_2$, screened and pressed at $P_2$. The 0.512 pound, 4.8% solids, 2° F thin phase yield from press $P_2$ is reslurried and pressed again at $P_{2A}$ leaving a second stage thin phase yield of 0.103 pound of 0.04% solid, 2° F material for the $X_6$ exchanger combination.

The 0.409 pound, 6% solids thick phase yield from press $P_{2A}$ is directed to condensing water heat exchanger $X_7$.

From press $P_2$, the 0.873 pound, 21% solids, 2° F thick phase yield is further cooled to −5° F by refrigerator $R_3$, screened and pressed at $P_3$. The 0.303 pound, 7.8% solids, −5° F thin phase yield from press $P_3$ is combined with other sources for recycle.

The 0.570 pound, 28%, −5° F thick phase yield from press $P_3$ is further cooled to −10° F by refrigerator $R_4$, screened and pressed at $P_4$. The 0.164, 13% solids, −10° F thin phase yield from press $P_4$ is directed to the condensing water exchanger $X_7$ combination.

The 0.406 pound, 34% solids, −10° F thick liquid phase yield from press $P_4$ is sustained at −10° F but an additional portion thereof crystallized by refrigerator $R_5$ to remove additional heat of fusion before being screened and pressed at $P_5$. The 0.070 pound, 14.6% solids, −10° F thin phase yield from press $P_5$ is directed to the recycle mixing station B.

The 0.336 pound, 38% solids, −10° F thick phase yield from press $P_5$ is further cooled by refrigerator $R_6$, screened and pressed at $P_6$. The 0.054 pound, 16.7% solids, −15° F thin phase yield from press $P_6$ is directed to the heat exchanger $X_7$.

The 0.284 pound, 42% solids, −15° F thick phase yield from press $P_6$ is next directed to heat exchanger $X_1$ where the temperature thereof is increased by 158° to 143° F. The heating medium of the exchanger $X_1$ is the 190° F virgin black liquor stream entering the concentration system.

From heat exchanger $X_1$, the 0.284 pound, 42% solids stream is passed through heat exchanger $X_4$ to absorb sensible heat from the heated, refrigeration condenser coolant which will further increase the thick phase stream to 200° F.

Apparatus H in the thick phase flow stream may be either an auxiliary fuel heater to further raise the stream temperature to an efficient pumping temperature of 230° F or a direct contact evaporator further concentrating the thick phase stream prior to injection into the hearth of a steam generation furnace where the organic compounds thereof are burned for heat release.

The furnace ash or smelt residual to combustion may be further processed by known techniques to recover the inorganic chemical values.

Figure 3:
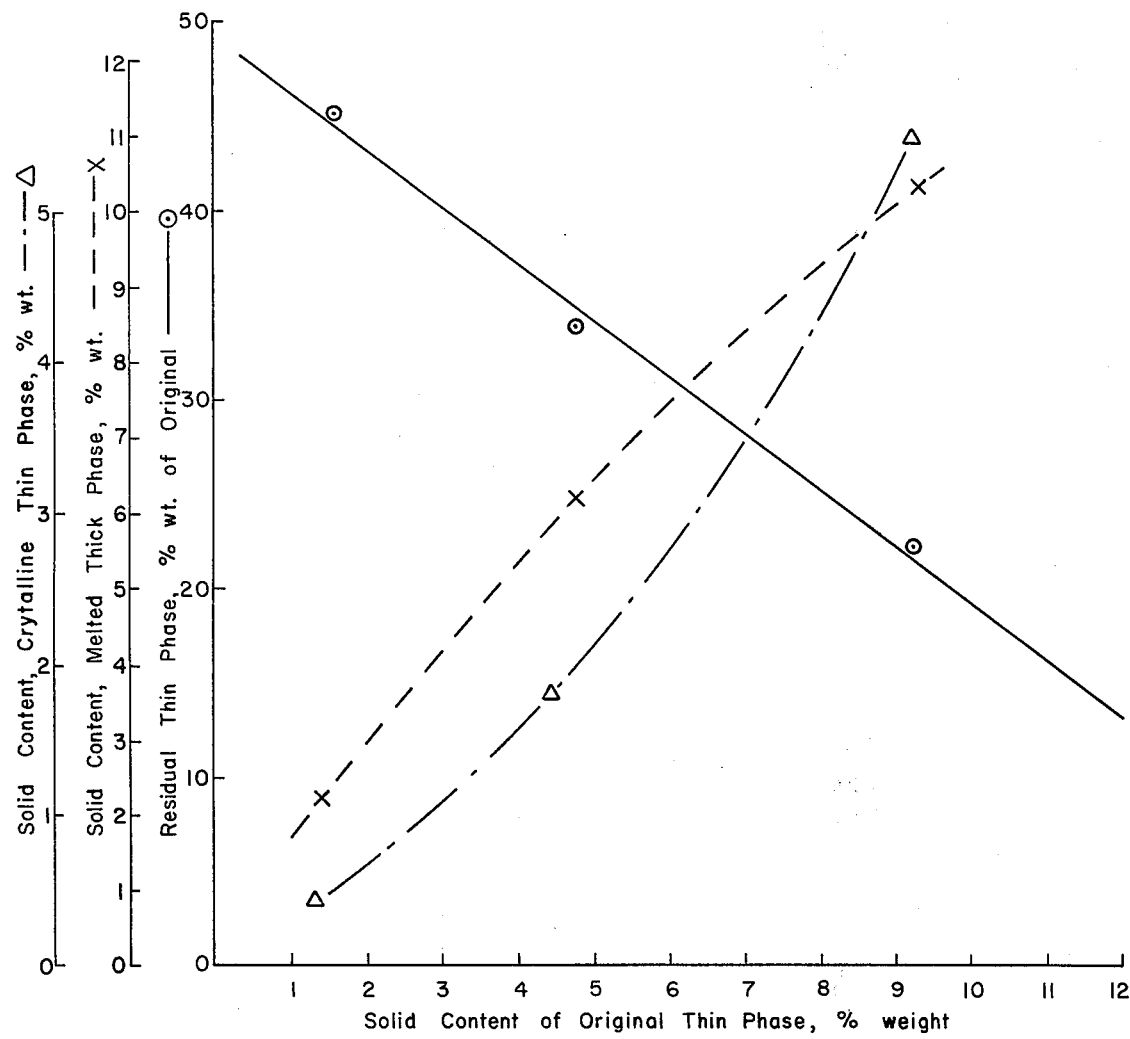
FIG. 3 is a performance graph descriptive of the operation of an auxiliary phase separation step.

For additional purification of the thin phase yield from a press, the conglomerated crystalline mass may be thawed sufficiently to permit the lower heat of fusion compounds, which contain the residual solids, to melt. Upon liquefaction, these solid carrying compounds may be simply drained away from the remaining higher heat of fusion ice. FIG. 3 illustrates the performance of this technique wherein the ordinate describes three parameters relative to the solid content of the original crystalline mass, as plotted against the abscissa. The first parameter, Residual Thin Phase, describes, as a weight percentage of the original pressed ice mass, how much of the original mass should be allowed to melt for optimum yield. A greater solid content in the original mass requires a greater percentage of that mass to be liquefied for optimum solids separation.

The Solid Content parameters indicate the weight percentage quantity of solids to be extracted with the respective thin and thick phases, such weight percentages corresponding with the plotted optimum liquefaction parameter.

In the aforedescribed plant system, such a melt separation technique may be applied to the thin phase yield from each press. For greatest thermal efficiency, however, melt separation would be limited to the thin phase yield from the auxiliary presses $P_{1A}$, $P_{1B}$ and $P_{2A}$ respective to the first two line stages.

Figure 4:
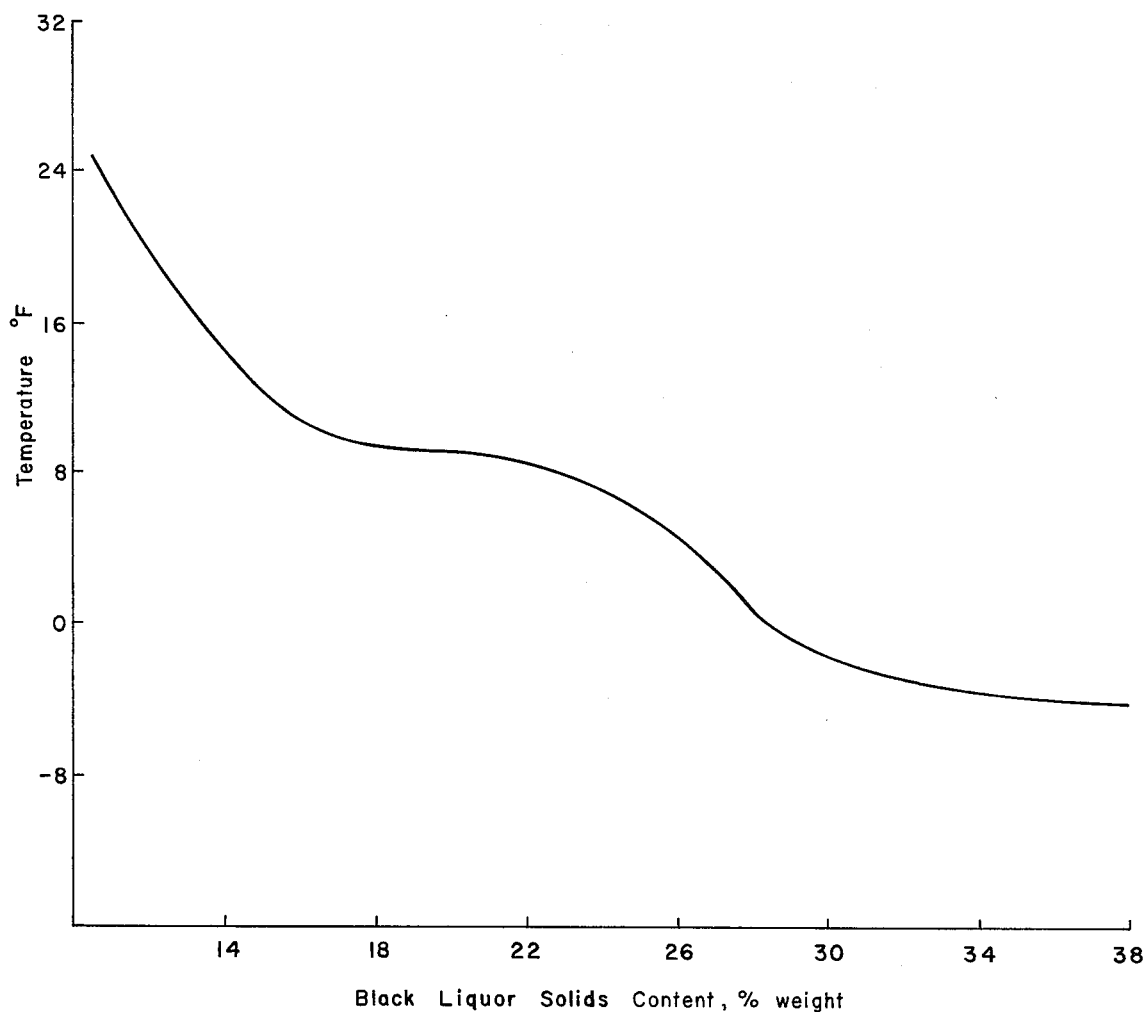
FIG. 4 is a performance graph describing the temperature to which a flow stream should be cooled relative to the flow stream solids concentration.
Figure 5:
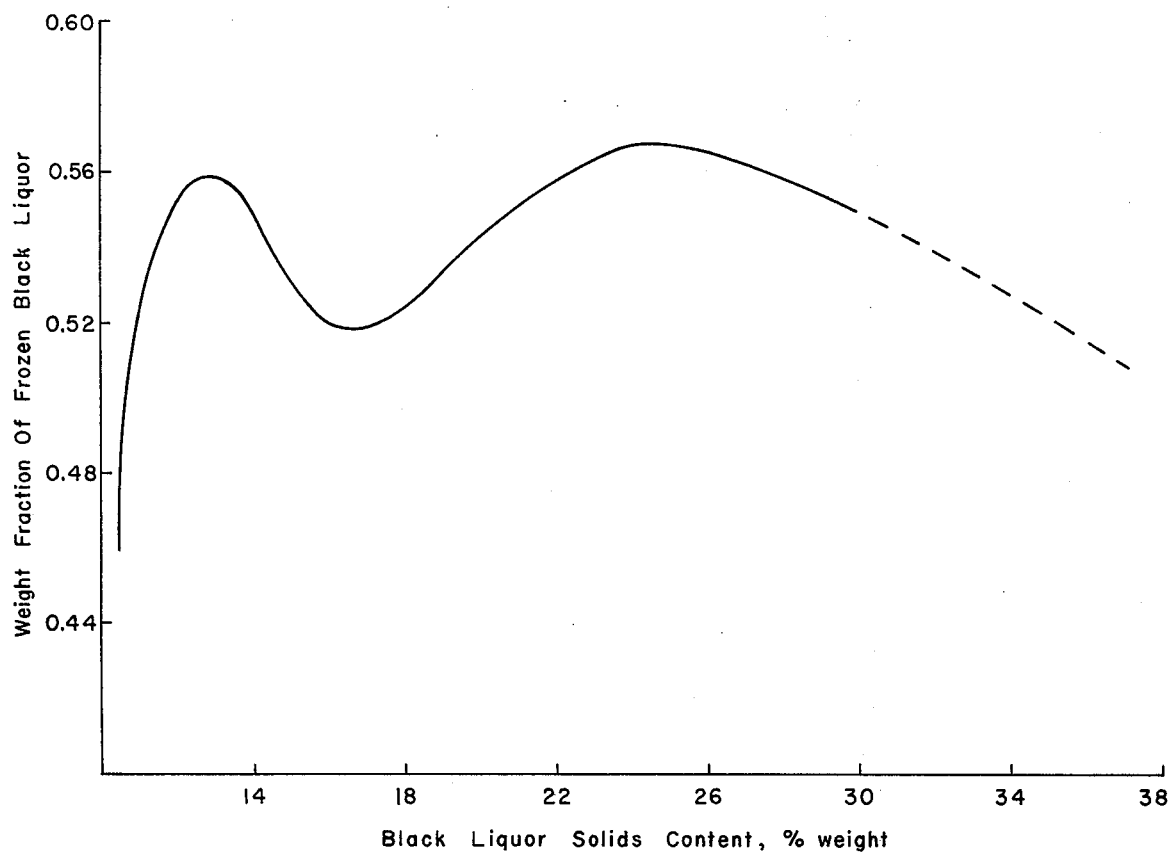
FIG. 5 is a performance graph describing the weight percentage of a flow stream to be frozen relative to the solids concentration thereof.
Figure 6:
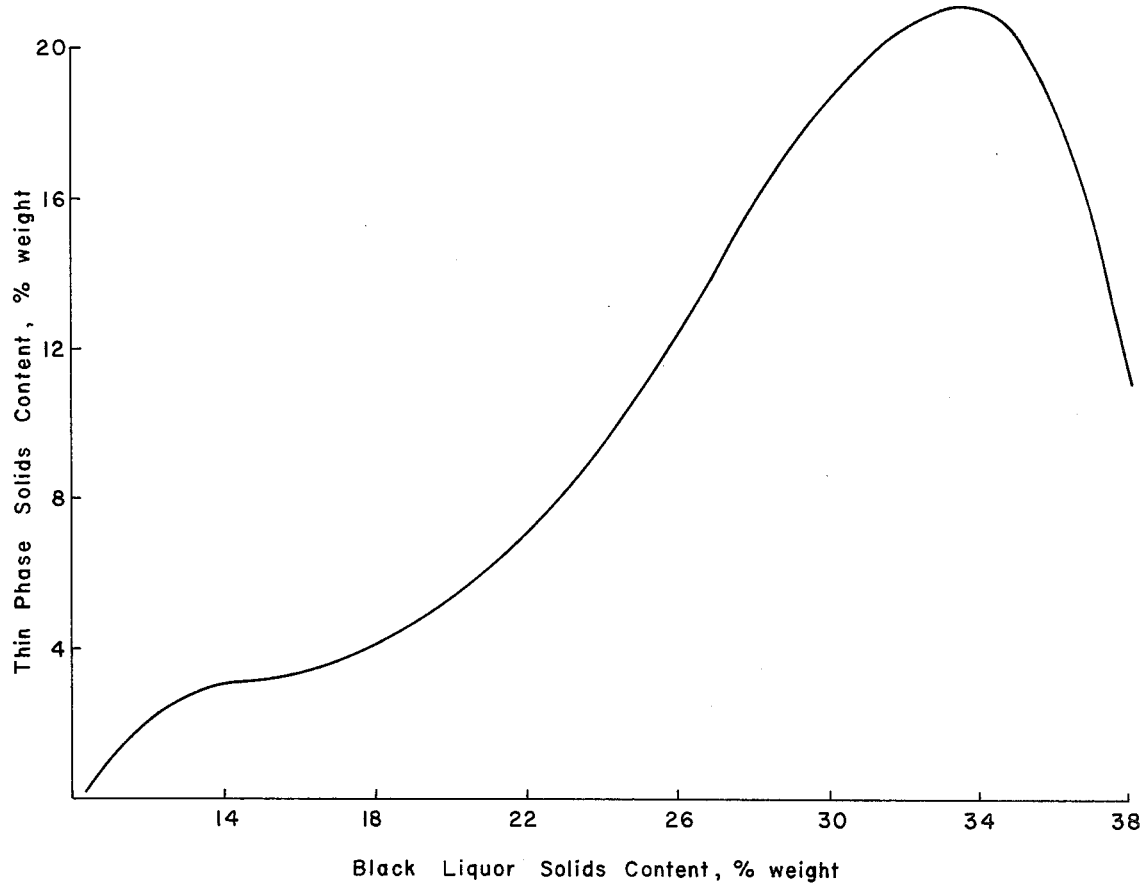
FIG. 6 is a performance graph describing the percentage of solids in a thin phase press residual relative to the inflow stream solids concentration.

It will be noted from the plant system description that each refrigeration stage freezes only a discreet percentage of solution supply. FIGS. 4, 5 and 6 disclose corresponding optimum data from kraft pulping process black liquors, all plotted against the weight percentage solids content of the supply stream.

FIGS. 4 and 5 are considered collectively to determine the temperature (FIG. 4) required to crystallize the optimum percentage of solvent (FIG. 5). FIG. 6 describes the weight percentage of solids present in a thin phase yield pursuant to FIGS. 4 and 5.

It will be appreciated that for each refrigeration stage, an infinite combination of corresponding thin and thick phase percentages may be developed. This range of selection must be viewed from the perspective of absolutes and energy requirements incident thereto. For example, by removing sufficient energy from a flow stream sample, the entire sample may be solidified. Such an exercise would not accomplish the separation objective, however. Although some separation may be acquired from liquefaction incident to the axial pressing step, obviously such a technique does not represent the most efficient utilization of the energy expenditure. By operating each separation stage pursuant to an approximation of the FIGS. 4 and 5 data, energy efficiencies may be optimized.

It will be noted that the present invention has been described relative the concentration of a 12% solids, virgin black liquor flow stream to one of 42% solids. There is nothing limiting however, in these particular solids concentration quantities or to any of the intermediate concentrations incident to this description. Moreover, more or less freeze-press stages may be used in the manner disclosed to obtain, respectively, more or less, solids concentration. However, the thermal efficiency of greater concentration by freezing diminishes rapidly as compared to thermal concentration. Accordingly, the 42% concentration level, or approximately thereabout, by freezing is deemed an appropriate optimum for kraft process pulping liquors.

Having described my invention I claim:

1. A process for concentrating dissolved solids in a liquid solution of black liquor from a pulping digester comprising the steps of:
   A. Crystallizing approximately 44 to 56 weight percentage of the total weight of solution of solution solvent from a black liquor solution comprising 10 to 18 weight percentage of solids by the removal of heat therefrom;
   B. Separating crystals formed by said crystallizing step from remaining liquid thick phase solution by screening;
   C. First pressing said crystals in mass by axially applied pressure to express additional thick phase solution occluded between crystals;
   D. Relieving the stress of said first pressing on the mass therefrom;
   E. Isothermally mixing said stress relieved mass of pressed crystals to redistribute residual occluded thick phase solution without shearing the crystals;
   F. Second pressing said crystals in mass by axially applied pressure to express additional thick phase solution occluded between crystals, there being no substantial addition or removal of heat relative to said mass between first and second pressing.

2. A process as described by claim 1 wherein crystallized solvent remaining after said second pressing is heat exchanged with an inflow stream of black liquor.

3. A process as described by claim 1 wherein additional heat is removed from the solution expressed from said second pressing to crystallize an additional portion of solvent included therein, said expressed solution being thereafter screened to separate crystals formed by said additional heat removal from the remainder of said expressed solution, said crystals receiving a third axial pressing in mass to express additional solution therefrom.

4. A process as described by claim 3 wherein crystallized solvent remaining after said third pressing is heat exchanged with an inflow stream of black liquor.

5. A process as described by claim 3 wherein the screened and expressed solution relative to said third pressing is combined with an inflow stream of black liquor for recycle through said process.

6. A process as described by claim 1 wherein a portion of crystallized solvent remaining after said second pressing is quiescently reliquefied by the absorption of heat to wash additional occluded solution therefrom.

7. A process as described by claim 1 wherein said crystallizing, screening and first pressing steps constitute a first concentration stage, the mass of pressed crystals being a thin phase yield from said first concentration stage and the screened and expressed solution being a thick phase yield therefrom, said process further comprising subjecting the thick phase yield from said first concentration stage to a second concentration stage, the thin phase yield from said second stage being isothermally mixed to redistribute occluded thick phase yield for expression by a subsequent axial pressing.

8. A process as described by claim 7 wherein the thin phase yield from said subsequent pressing is heat exchanged with an inflow stream of black liquor.

9. A process as described by claim 7 wherein the thick phase yield from said subsequent pressing is combined with an inflow stream of black liquor for recycle through said process.

10. A process as described by claim 7 wherein the thick phase yield from said second concentration stage is subjected to additional concentration stages, the thick phase yield from each additional stage being advanced to a subsequent stage, the thin phase yield from each additional stage being combined with an inflow stream of black liquor for recycle through said process.

11. A process as described by claim 10 wherein the thick phase yield from a final additional concentration stage is heat exchanged with an inflow stream of black liquor.

* * * * *

UNITED STATES PATENT OFFICE
CERTIFICATE OF CORRECTION

PATENT NO. : 3,987,641
DATED : October 26, 1976
INVENTOR(S) : Hong H. Lee

It is certified that error appears in the above-identified patent and that said Letters Patent are hereby corrected as shown below:

Page 1, line 2 of the title, following the word "PULPING" insert --LIQUORS--. Column 1, line 2, following "PULPING" insert --LIQUORS--; line 15, "of" first occurrence should be --to--; line 22, "organic" should be --inorganic--. Column 2, line 39, "through" should be --throughout--; line 65, following "unit" insert --of time--. Column 3, line 7, "1,336" should be --1.336--; line 29, delete "the"; line 36, "of" first occurrence should be --or--. Column 6, line 27, following "evaporator" insert --for--. Column 7, line 35, following "invention" insert --,--.

Signed and Sealed this

First Day of February 1977

[SEAL]

Attest:

RUTH C. MASON
Attesting Officer

C. MARSHALL DANN
Commissioner of Patents and Trademarks